Aug. 25, 1970          W. R. HOOVER          3,525,489
SPRING-LOADED WHEEL SPINNING APPARATUS
Filed June 23, 1969
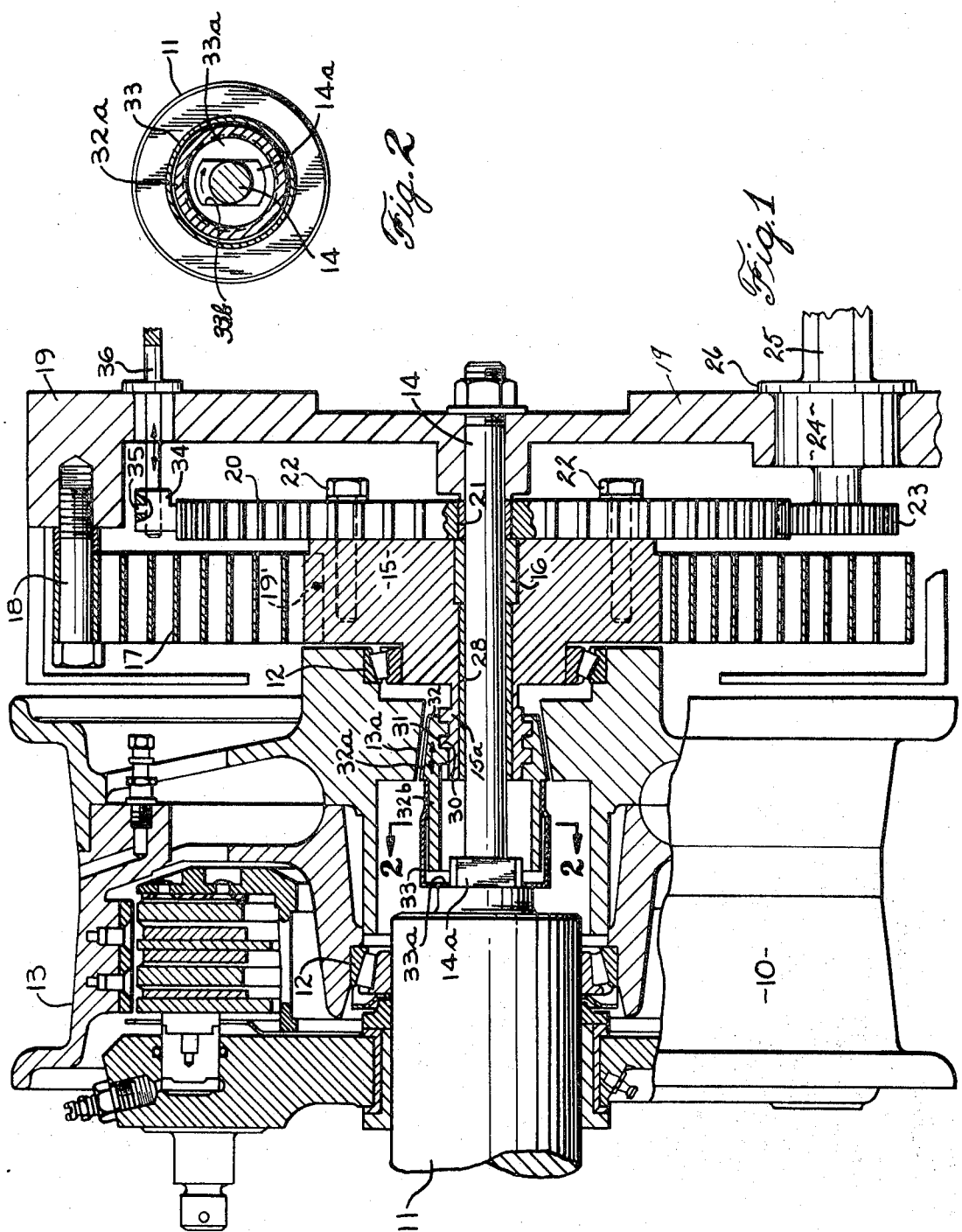
INVENTOR.
WILLIAM R. HOOVER
BY
Baldwin, Egan, Walling & Fetzer
ATTORNEYS United States Patent Office 3,525,489
Patented Aug. 25, 1970

3,525,489
SPRING-LOADED WHEEL SPINNING APPARATUS
William R. Hoover, 5942 Horning Road,
Kent, Ohio 44240
Filed June 23, 1969, Ser. No. 835,818
Int. Cl. B64c 25/40
U.S. Cl. 244—103                                2 Claims

ABSTRACT OF THE DISCLOSURE

To spin the wheel of an airplane before it sets down on a runway, a spiral spring is provided concentric of a wheel supporting spindle has its outer end fixed relative to the frame of the vehicle while its inner end is attached to a drum adapted to rotate a sleeve extension thereof in wheel spinning direction, which sleeve extension has a male thread engaging the female thread of a clutch adapted to engage or disengage the surrounding wheel. The arrangement is such that the clutch is engaged by rotation of the sleeve extension in spring-unwinding direction and the clutch is disengaged by rotation of the wheel in vehicle-advancing direction.

---

The present invention relates to a novel means for causing the wheel of an airplane, or other vehicle, to spin upon release of a pre-wound spring, as for instance, when an airplane is about to set down on a runway. The energizing spring of this invention is adapted to be pre-wound by means external of the vehicle such as a portable drill type of connection powerful enough to wind a rather large spiral spring to provide the power necessary to spin the heavy airplane wheels in common use today. The invention requires a small number of parts and is capable of operating a great number of times without mechanical failure.

In the drawings,

FIG. 1 is a central sectional view taken on the diameter of a wheel spindle equipped with a wheel and the novel wheel spinning device of this invention; while FIG. 2 is a fragmental sectional view taken along the line 2—2 of FIG. 1.

Many of the devices heretofore conceived by spinning the wheels of an airplane just before it lands on a runway have either been of insufficient power to spin such wheels quickly or they have involved such cumbersome and weighty apparatus as to add undesirable dead weight to the vehicle. It is an advantage of the present invention that it provides a simple device not weighing very much and which is capable of spinning an airplane wheel within a matter of seconds after a pre-loaded spring is released.

Referring to the drawings, a wheel 10 is shown intended for use on an airplane or the like. It is supported on an axial shaft 11 by means of bearings 12. The rim 13 is adapted to receive a tire in the usual manner and apparatus is provided for inflating the tire, for applying brakes to the wheel, and for other functions which have nothing to do with the present invention.

A spindle 14 which is rigid with and concentric with the shaft 11 rotatably mounts a drum 15 on a bearing 16. A powerful spiral spring 17 has its outer end fixed at 18 to a portion 19 rigid with the vehicle. The inner end of the spring is fixed at 19' to the periphery of the drum 15.

Means is provided for winding the spiral spring to load it utilizing power means external of the vehicle. To this end, a large gear 20 is rotatably mounted on the spindle 14 by means of bearing 21. This gear is secured by bolts 22 to the drum 15. A pinion 23, meshing with gear 20, is carried by a hub 24 which is rotatably entered into a frame portion 19 or other suitable portion of the vehicle frame. A non-circular portion 25 of the hub 24 extends outwardly beyond the frame of the vehicle where it is available for attachment to a power tool for the purpose of rotating the pinion 23, and the gear 20, to pre-wind the spring 17. A shoulder 26 between the members 24 and 25 limits the movement of pinion 23 toward the left as viewed in FIG. 1 when 23 and 24 are positioned to wind up spring 17. After winding the spring and securing detent member 34, the power tool is withdrawn from member 25.

A sleeve extension 15a is rotatably mounted on spindle 14 by means of bearing 28. The laterally innermost end of this sleeve extension is provided with a male thread 30 which interengages a female thread 31 on a releasable clutch means 32. This clutch means has a cone shaped friction clutching end 32a which is complementary to an adjacent clutching surface 13a on the hub of the wheel 13 as seen in FIG. 1. The inner cylindrical end 32b of the releasable cone clutch means is resiliently gripped by the rim of a cup shaped member 33 which has an inner wall 33a at right angles to the spindle 14 which portion 33a has a non-circular opening 33b gripping a similarly shaped non-circular projection 14a of the spindle 14. It results from this construction that relative rotation is possible between the parts 32b and 33 but sufficient frictional drag is supplied where they engage each other to hold the releasable clutch means 32 in operation of the device presently to be described.

With the wheel of the vehicle resting upon the ground, a power tool is applied to the projection 25 which thereby enables the rotation of the pinion 23 which will thus rotate the gear 20 in a spring winding direction to wind up the spiral spring 17 around the drum 15. This movement of gear 20 and drum 15 is counterclockwise as viewed in FIG. 2. When spring 17 is wound up a detent member 34 is applied to hold it in that condition. This detent member is rigidly secured by a set screw 35 to a non-circular shaft 36 which slides in a non-circular snugly fitting opening in the frame member 19. In the position shown in FIG. 1, the detent member 34 engages the teeth of the gear 20 and holds the spring 17 in a tightly wound condition. The power spring winding device is then withdrawn and the vehicle is ready for flight.

Later, as the airplane comes down toward a runway, the pilot by means not shown detaches the detent 34 by moving the shaft 36 toward the right as viewed in FIG. 1 whereupon spring 17 unwinds quickly and forcefully to rotate wheel 13 in a clockwise direction as viewed in FIG. 2 and indicated in an arrow in that figure. At this time, drum 15 rotates sleeve extension 15a. As this sleeve extension rotates, the threads 30 engage the threads 31 of the clutch means 32 to drive the clutch 32 toward the right as viewed in FIG. 1 and this action is made possible because of the friction drag of the resilient rim of cup member 33 previously described. This engages the cone shape faces 32a and 13a so as to rotate the wheel carried by the structure 13 in the proper direction to accommodate landing action of the plane. After the plane lands, unwound spring 17 places a drag on drum 15 and its extension 15a, in fact, spring 17 drives drum 15 a little past the completely unwound position and then the spring recovers while giving drum 15 a slight movement backwards helping to disengage clutch 32a. Then rotation of the wheel 13 in vehicle-advancing direction completes disengagement of the clutch faces 32a and 13a because a slight rotation of the drum extension 15a as wheel 13 rotates causes movement of clutch 32 (held by cup 33) toward the left as viewed in FIG. 1, thus disengaging the cone faces of the clutch.

Thus, by the use of this invention, an efficient, prestressed spring means is provided for spinning the wheel 13 when desired but at all other times the wheel rotates freely without hindrance from this invention.

While this invention has been described in connection with the wheel supporting an airplane, it should be understood that it can be applied to other vehicles, even to a toy, by properly proportioning the parts.

What is claimed is:

1. Means for spinning a vehicle wheel, as for an airplane, comprising a spindle, a wheel rotatably mounted on said spindle, a drum rotatably mounted on said spindle and having a rigid sleeve extension, a releasable clutch means (13a, 32a) between said sleeve extension and said wheel, a spiral spring having its inner end secured to said drum and having its outer end fixed relative to said vehicle, means for winding said spring to load it including a drive member with which a power tool is attachable and detachable, releasable means for holding said spring loaded, coacting threads engaged between said releasable clutch means and said sleeve extension, means providing a friction drag on said releasable clutch means, and said threads being so constructed and arranged that said releasable clutch means is disengaged by rotation of said wheel in vehicle-advancing direction.

2. Wheel spinning means as defined in claim 1, wherein said first named releasable clutch means comprises a cone clutch and there being a coacting cone surface in the hub of said wheel adjacent said cone clutch.

References Cited

UNITED STATES PATENTS 2,050,741   8/1936   Speir _____ 244—103
2,198,834   4/1940   Nardone _____ 244—103

FERGUS S. MIDDLETON, Primary Examiner

P. E. SAUBERER, Assistant Examiner